United States Patent [19]
Miller

[11] Patent Number: 4,885,713
[45] Date of Patent: Dec. 5, 1989

[54] SYSTEM FOR DIGITIZING THE TRAJECTORY OF A TARGET POINT OF A MOVING BEAM

[75] Inventor: Norbert Miller, Mönchen-Gladbach, Fed. Rep. of Germany

[73] Assignee: Tektronix, Inc., Beaverton, Oreg.

[21] Appl. No.: 41,381

[22] Filed: Apr. 22, 1987

[51] Int. Cl.$^4$ .......................... G06J 1/00; G06F 3/153
[52] U.S. Cl. ..................... 364/604; 315/364; 340/732; 364/728.01; 364/855
[58] Field of Search ............... 364/602, 604, 607, 728, 364/851, 855; 315/364, 367, 369, 372, 383; 340/723, 732, 736, 789, 793

[56] References Cited

U.S. PATENT DOCUMENTS

| | | | |
|---|---|---|---|
| 4,074,359 | 2/1978 | Hasenbalg | 364/855 X |
| 4,156,914 | 5/1979 | Westell | 364/604 X |
| 4,238,826 | 12/1980 | Jones, Jr. | 364/855 X |

Primary Examiner—Joseph Ruggiero
Attorney, Agent, or Firm—John D. Winkelman; John P. Dellett

[57] ABSTRACT

The trajectory across a surface of an intended target point of a moving beam directed toward the surface is digitized by finding a particular point along each of a plurality of parallel axes of the surface for which a two-dimensional convolution integral of two functions is a maximum. A first of the two functions is the instantaneous intensity distribution of the beam on the surface with respect to the instantaneous position of the target point on the surface. The second function is the average beam intensity distribution on the surface produced as the beam moves across the surface during a finite period. A digital data sequence is generated in which each element thereof represents the position on the surface of a separate one of the particular points determined in this fashion, and this sequence represents the trajectory of the target point of the beam on the surface.

9 Claims, 4 Drawing Sheets

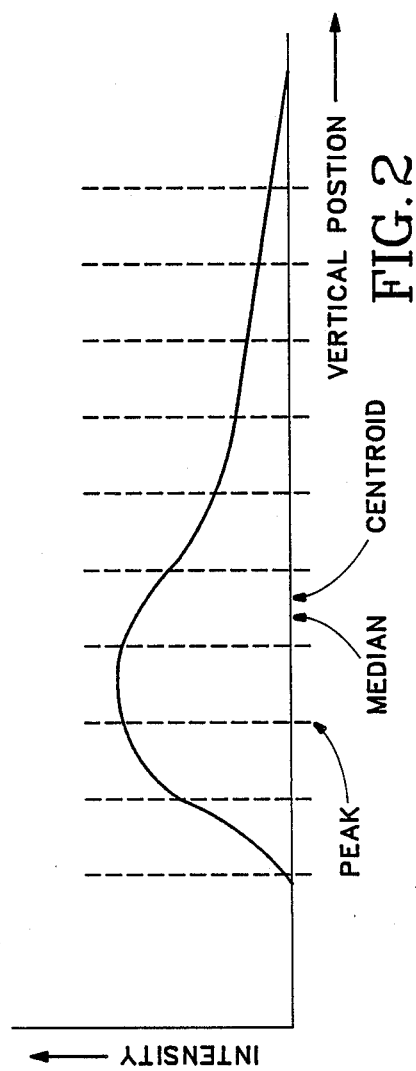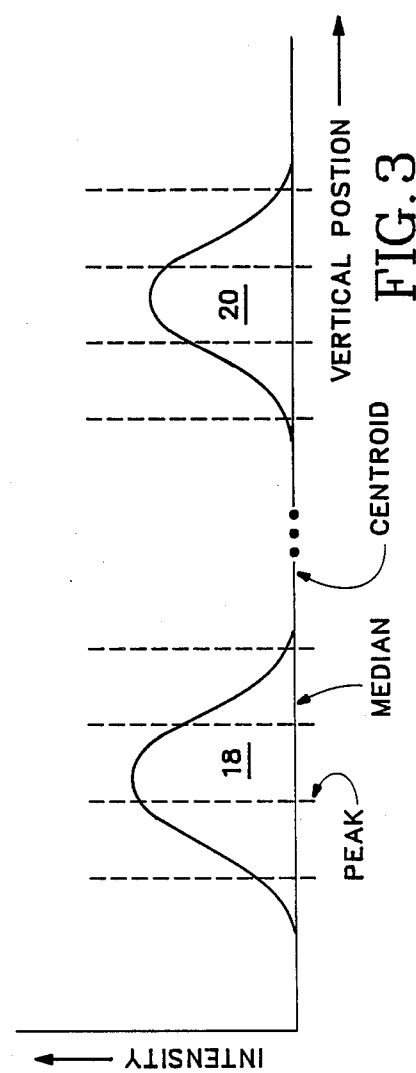

SYSTEM FOR DIGITIZING THE TRAJECTORY OF A TARGET POINT OF A MOVING BEAM

BACKGROUND OF THE INVENTION

The present invention relates to a system for digitizing the trajectory of the intended target point of a moving beam wherein the beam has a distributed intensity on a surface at which it is directed.

A typical analog oscilloscope produces a waveform representing the time varying behavior of an input signal by utilizing the input signal to control the vertical position of an electron beam as it sweeps horizontally across a phosphorescent screen. After the beam strikes phosphors on the screen the phosphors glow for a time, and if the persistence of the phosphors is long enough in relation to the sweep rate of the beam, the glowing phosphors show the trajectory ("trace") of the beam across the screen, thereby providing a waveform display representing the behavior of the input signal. However, inasmuch as the phosphors in many oscilloscopes glow only for a brief period of time after excitation by the beam, the waveform display must be refreshed by repetitive sweeps of the beam across the screen in order for the waveform to be observed. Such oscilloscopes are typically utilized to monitor periodic input signals which can control the vertical position of the beam in the same way during each sweep so that a similar waveform is displayed in response to each sweep.

Some analog "storage" oscilloscopes utilize phosphors which are highly persistent so that a waveform produced in response to a single sweep of the beam is displayed for relatively long time. Storage oscilloscopes are often used to capture and display no-repetitive signal bursts, but the display produced by such an oscilloscope eventually fades. Storage oscilloscopes have been fitted with photographic cameras which permanently record the waveform display; however, photographic film is expensive and may require an inconvenient amount of time to develop and print.

It is often desirable to digitize a waveform so that its characteristics can be analyzed by a digital computer and so that information about the waveform can be compactly and inexpensively stored in digital data storage media. The Tektronix model DCS01 Digitizing Camera System employs a video camera which may be aimed at an oscilloscope screen, the camera system utilizing a charge-coupled device (CCD) to produce an array of digital data representing the light intensity distribution over the surface of the oscilloscope screen. The CCD comprises a closely spaced array of MOS capacitors. Each capacitor, under controlled bias conditions, acquires charge in proportion to the amount of light striking the capacitor during a sampling period, and the voltage developed by any capacitor of the array is thus proportional to the time-averaged light intensity of a corresponding portion of the oscilloscope screen during the sampling period. The charges built up in the capacitors during the sampling period are subsequently shifted from capacitor-to-capacitor along rows of the capacitor array to provide voltage signals at output terminals of the device. These voltage signals are multiplexed to produce an RS170 standard video signal. The video signal is then digitized by an eight-bit analog-to-digital converter into a 490×480 element digital data array representing the light intensity distribution of the waveform display.

At any instant during its sweep across the oscilloscope screen, the beam is nominally directed at a target point on the screen at horizontal and vertical positions on the screen representing the current magnitudes of the sweep and input signals, respectively. However, the electron beam has a non-uniform, two-dimensional intensity distribution in the plane defined by the surface of the screen, and typically an area of the screen surrounding the target point is illuminated, not just the target point itself. The intensity distribution of the beam, which may or may not be substantially Gaussian, nonetheless typically has a relatively more intense central portion and a less intense peripheral portion, and as the beam sweeps across the screen it produces a "feathered" trace in which phosphors near the center of the trace glow more brightly than phosphors near the edge of the trace. When the trace is subsequently "captured" in the form of a charge distribution within the CCD of the camera system, and then converted into the 490×480 element data array, the resulting data array represents the two-dimensional light intensity distribution on the screen.

The 490×480 element intensity data array could be stored and utilized directly to control a 490×480 pixel computer-generated display wherein the value of each data word determines the intensity of a corresponding pixel. In such case, a computer-generated waveform display based on this intensity data would have an appearance substantially identical to the original waveform displayed on the oscilloscope screen and would mimic the feathered intensity distribution of the trace forming the original waveform display on the oscilloscope.

However, it is inconvenient and expensive to provide enough memory to store 490×480 eight-bit data words for each waveform to be stored. Moreover, it is not particularly desirable to display a waveform having a feathered trace inasmuch as an operator typically wishes to view a waveform as a fine, distinct line representing the trajectory of the intended target point of the beam as the beam sweeps across the screen. In addition, when the data is to be analyzed by a digital computer to determine characteristics of the waveform such as peak value, period, rise time and the like, it is difficult for the computer to ascertain such characteristics from waveform data presented in the form of an intensity distribution data array.

The 490×480 element intensity data array may be thought of as 490 sequences of 480 words, each sequence representing the intensity distribution along a separate vertical axis of the oscilloscope screen. To present waveform data in a more compact and useful form, each one of the data sequences indicating intensity distribution along a corresponding vertical axis on the oscilloscope screen may be converted by a digital computer to a single data element indicating a single vertical position on that axis. Ideally, that vertical position should represent the intended target point of the beam along that axis when the beam moved across the axis, the "intended target point" being the point on the oscilloscope screen that represents the actual magnitude of the input signal at the time (or sweep signal magnitude) represented by the vertical axis. Since there are 490 intensity data sequences, a single waveform magnitude data sequence of 490 data elements would be produced. The computer may then produce a waveform display by illuminating a line of 490 pixels across a CRT screen, the vertical position on the screen of each successive pixel of the line being determined by the magnitude of a successive one of the elements of the waveform magnitude data sequence, the intensity of the illuminated pixels being uniform. Thus the line ("trace") forming the computer generated waveform is not several pixels wide with each pixel having a different intensity (as would be the case when the intensity data array is utilized to directly control the waveform display), but rather is only a single pixel wide and pixels in the trace are uniformly illuminated.

FIG. 1 shows an idealized representation of light intensity distribution of a typical trace as might be produced on an analog oscilloscope screen in response to a square wave input signal, the trace being magnified to more clearly show the light intensity distribution. The darkest portions of the trace represent areas of highest light intensity and the lightest portions of the trace represent areas of lowest light intensity. Since the beam has a non-uniform intensity distribution and moves at non-uniform rates across the screen, the trace has non-uniform intensity. At waveform peaks 10, where the beam traverses the screen horizontally at a relatively slow rate, the light intensity of the trace is highest particularly in interior portions 12 of the trace produced by high intensity interior portions of the beam. The trace intensity is lower near its periphery 14 produced in response to low intensity peripheral portions of the beam. On the leading and trailing edges 16 of the waveform, the light intensity of the trace is very low because in these areas the beam moves rapidly and does not supply enough energy to substantially excite phosphors on the screen.

FIG. 2 is a diagram of light intensity distribution along vertical axis 2—2 of the display of FIG. 1. The vertical dotted lines of FIG. 2 represent positions along axis 2—2 corresponding to the centers of screen areas sensed by separate capacitors of the CCD along a capacitor array axis corresponding to axis 2—2. Each CCD capacitor measures a light intensity substantially equal to the intensity shown on the curve of FIG. 2 where a corresponding dotted line crosses the intensity curve. In the example of FIG. 2, the intensity distribution of the trace along axis 2—2 is somewhat bell-shaped although not Gaussian since in this example the intensity distribution of the beam does not happen to be Gaussian. The CCD device represents this distribution as a set of voltage levels which are converted into a sequence of 490 digital data values. For the intensity distribution along axis 2—2 of FIG. 2, only 11 of the 490 digital data values will be non-zero.

As previously discussed, it is desirable to convert this sequence into a single data value indicating the intended target point of the beam as it bisected axis 2—2. However, to determine an intended target point of the trace along the axis based on the intensity distribution requires an assumption to be made as to how the intended target point is related to the intensity distribution. Under the assumption that at any given time the most intense portion of the beam is directed to the target point, one might choose the position of the brightest point along axis 2—2 as the target point of the beam as it crossed axis 2—2. Accordingly, one might simply scan the 480 data values to determine which is largest and assume that the point along axis 2—2 corresponding to the largest intensity data value is the point of maximum intensity along the axis. In the example of FIG. 2, the data value corresponding to the vertical axis marked "peak" is near the actual peak of the waveform distribution. However, when noise causes a spike in the intensity distribution of the beam, the spike may strongly influence the apparent intensity maximum. Also the value of the peak determined by this method depends on the relative positions of the capacitors in the CCD with respect to the waveform display such that peaks of repetitive cycles of a periodic waveform may not appear to have consistent values. Finally, the assumption that the intended target point of the beam occurs at the point of maximum intensity along each vertical axis on the screen is usually inaccurate. In an analog oscilloscope, calibration of vertical and horizontal position of a trace is often performed manually and an operator performing the adjustment may not set the brightest portion of the beam at the target point on the screen. In fact, in a poorly calibrated oscilloscope, no part of the beam may actually strike the intended target point.

Other methods of digitizing the trajectory of the target point of the beam across the screen assume that the beam is aimed at points corresponding to the median or centroid of the light intensity distribution along each vertical axis on the screen. The "median" of the light intensity distribution of FIG. 2 is the point at which the areas under the curve on either side of the point are equal. The "centroid" of the distribution is its "center of mass". The centroid and median of the distribution of FIG. 2 are as shown and algorithms for finding the median or centroid of a curve are well known. When an intensity distribution along a single vertical axis is Gaussian, i.e. symmetrically bell-shaped, the centroid and the median both appear at its peak. However when the distribution is asymmetrical, as shown in FIG. 2, the centroid and median appear other than at the peak. In the example of FIG. 2, the maximum data value is closer to the actual peak than the median or centroid, but as the distribution becomes more "Gaussian" the centroid and median move toward to the distribution peak. Use of the centroid or median methods is usually advantageous over the peak intensity method because the target point of the waveform as determined by the centroid or the median method is not as strongly affected by noise as the position as determined by peak intensity and is not as strongly affected by the position of capacitors of the CCD with respect to the waveform display.

However, while the median and centroid methods provide fairly consistent results for a distribution along axis 2—2 of FIG. 1, these methods produce undesirable results for a distribution such as along axis 3—3 of FIG. 1, which distribution is shown graphically in FIG. 3. The distribution of FIG. 3 has left and right bell-shaped areas 18 and 20 corresponding to the top and bottom peaks of the waveform of FIG. 1 where intersected by axis 3—3, and a central area corresponding to the trailing edge of the waveform wherein the intensity of the trace is negligible. In this case the centroid is in the low intensity area between the peaks and the median is at a low intensity point near the rightmost side of area 18. It would be preferable to assign the target point of the waveform nearer the point corresponding to the center of larger area 18 so that a subsequently computer-generated waveform has more abrupt edges. Finally, the assumption that at any moment the beam was "aimed" at a target point on the screen corresponding to the median or centroid of the light intensity distributions along a vertical axis on the screen representing the current time is usually untrue. Thus the median and centroid methods, while more consistent than the maximum intensity method, are also inaccurate.

SUMMARY OF THE INVENTION

The present invention relates to a beam intensity sensing apparatus which digitizes the trajectory of the intended target point of a moving beam directed at a surface, and in particular to the case wherein the beam has a non-uniform intensity distribution on the surface at any instant. The sensing apparatus is of a type which produces an array of digital data, each data element of the array representing the average intensity of the beam as it strikes a separate portion of the surface during a sampling period such that the intensity data array indicates a time-averaged beam intensity distribution over the surface during the sampling period.

In accordance with the present invention, the trajectory of the target point across the surface of the sensing apparatus is digitized by finding a point along each of a plurality of parallel axes of the surface at which point a two-dimensional convolution integral of two functions is a maximum. A first of the two functions is the instantaneous intensity distribution of the beam on the surface with respect to the position of the target point on the surface, and the second function represents the time-averaged beam intensity distribution on the surface represented by the intensity data array. A digital data sequence is generated in which each element thereof represents the position on the surface of a separate one of the target points determined in this fashion, and this sequence represents the trajectory of the intended target point of the beam as the beam sweeps across the surface.

In a preferred embodiment of the invention, the beam is an electron beam within a cathode ray tube, and the surface of the sensing device comprises the screen of the cathode ray tube. The sensing device further comprises a video camera directed at the cathode ray tube, which camera includes a charge coupled device adapted to produce a sequence of output voltage signals representing the intensity distribution of light produced on the screen in response to the movement of the beam across the screen. An analog-to-digital converter converts the output voltage signals into the intensity data array. The intensity data array is supplied as input to a digital computer which evaluates convolution integrals to determine the target point trajectory as described hereinabove and produces the position data sequence accordingly.

The method of the present invention typically determines the trajectory of the intended target point of the beam as it moves across the oscilloscope screen more accurately and with higher horizontal resolution than prior art methods, including methods involving locating the peak, median or centroid of light intensity distribution along vertical axes of the screen, particularly when the function modeling the intensity distribution of the beam with respect to intended target point position is derived from accurate measurements of the beam distribution as a function of target point position.

It is accordingly an object of the invention to provide a method and apparatus for determining the trajectory of a target point of a moving beam directed onto a surface when the beam is of the type having a distributed intensity on the surface.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

DRAWINGS

FIG. 2 is a graph of light intensity distribution along axis 2—2 of FIG. 1;

FIG. 3 is a graph of light intensity distribution along axis 3—3 of FIG. 1;

DETAILED DESCRIPTION

Figure 1:
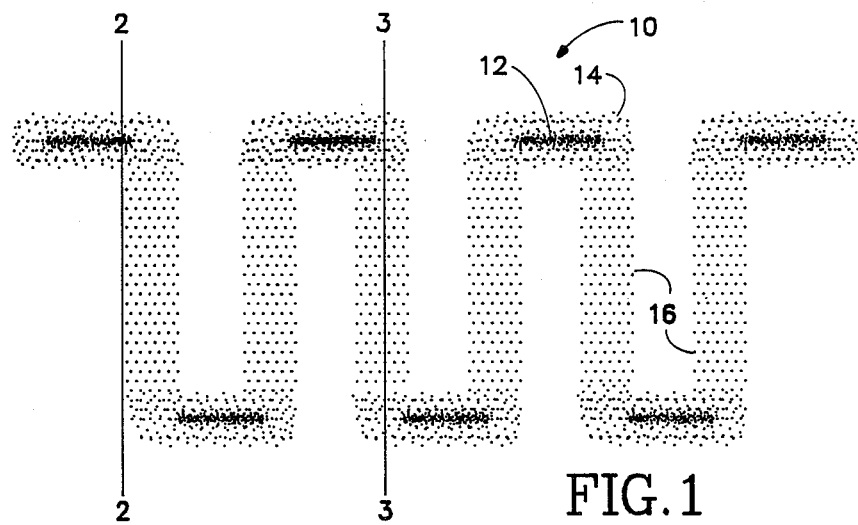
FIG. 1 is a representation of the intensity distribution of a waveform produced by an electron beam moving across the surface of a cathode ray tube screen.
Figure 4:
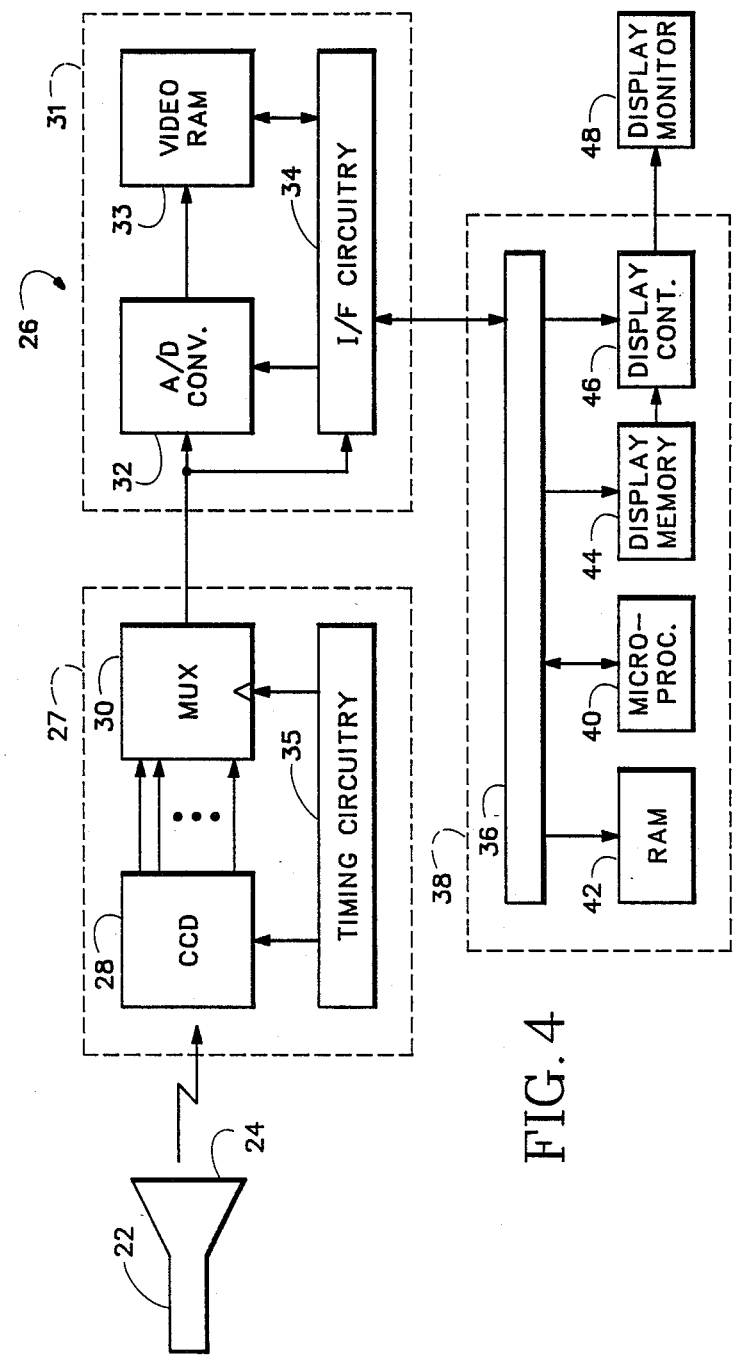
FIG. 4 is a block diagram of a waveform digitizing system suitable for implementing the present invention.

The present invention relates to a beam intensity sensing apparatus which digitizes the trajectory of the intended target point of a beam across a substantially planar surface of the sensing apparatus when the beam has a non-uniform instantaneous intensity distribution where it strikes the surface. With reference to FIG. 4, the beam may be an electron beam within a cathode ray tube (CRT) 22 of an analog oscilloscope and the surface of the sensing apparatus may comprise the screen 24 of CRT 22 at which the beam is directed. The sensing apparatus further includes a digitizing camera system 26, suitably comprising a Tektronix model DCS01 Digitizing Camera System, directed at the cathode ray tube so as to monitor waveform displays produced thereon.

The camera system 26 includes a digitizing camera 27 mounted on the oscilloscope screen. Camera 27 includes a charge coupled device (CCD) 28 adapted to produce sequences of output voltages representing the intensity distribution of light produced by screen 24. CCD 28 comprises a closely spaced array of MOS capacitors. Each capacitor, under controlled bias conditions, acquires charge in proportion to the intensity and duration of light striking the capacitor during a sampling period, and the voltage developed by any capacitor of the array represents the average light intensity produced by a corresponding portion of the oscilloscope screen 24 during the sampling period. The charges built up in the capacitors during the sampling period are subsequently shifted from capacitor-to-capacitor along rows of the array to provide a sequence of voltage signals at output terminals of the CCD. These voltage signals are transmitted as an RS170 standard video signal by multiplexer 30 to an eight-bit analog-to-digital (A/D) converter 32 within a video frame store board 31 of digitizing camera system 26 which produces digital data sequences in response thereto, each sequence representing the intensity distribution of the waveform display along a separate one of a plurality of parallel axes extending vertically across the oscilloscope screen 24. Thus the data sequences produced by A/D converter 32 form an array of digital intensity data, each data element of the array representing the average intensity of the beam as it strikes a separate portion of the screen during the sampling period, such that the intensity data array indicates a two-dimensional, time-averaged beam intensity distribution over the screen during the sampling period. The intensity data array produced by A/D converter 32 is stored in a video RAM 33 within frame store board 31.

The sampling and shifting of CCD 28 and the switching position of multiplexer 30 are controlled by timing circuitry 35 within camera 27. The operations of A/D converter 32 and video RAM 33 are controlled by interface circuitry 34 within frame store board 31 in response to commands carried on a bus 36 within a computer 38. Computer 38 suitably comprises an IBM model XT computer including a microprocessor 40, a random access memory (RAM) 42, a display memory 44, and a display controller 46. Interface circuitry 34 transfers the intensity data array stored in video RAM 33 to bus 36. Microprocessor 40, operating under program instructions stored in RAM 42, converts the intensity data array stored in video RAM 33 to a sequence of waveform data elements representing the magnitude of the waveform displayed on screen 24 as a function of time. This computer-generated waveform data sequence is then stored in RAM 42 which is suitably large enough to store waveform data sequences representing several waveforms previously displayed on oscilloscope screen 24.

Subsequently, when an operator wishes to view a computer-generated display of a waveform represented by a waveform data sequence stored in RAM 42 on a display monitor 48 controlled by display controller 46, the operator inputs a command to computer 38 through a keyboard (not shown), the command identifying the particular waveform to be displayed. The microprocessor 40 then accesses the appropriate waveform data sequence stored in RAM 42 and, acting under additional instructions stored in RAM 42, produces and stores bit-mapped display data in display memory 44 which data tells display controller 46 how to produce the waveform on display monitor 48. Display controller 46 periodically reads the bit-mapped data in display memory 44 and updates the display on monitor 48 accordingly.

The present invention relates to the way in which microprocessor 40 converts the intensity data array produced by camera system 26 to a sequence of waveform data representing the magnitude of the waveform displayed on screen 24 as a function of time. In a typical analog oscilloscope, the electron beam has a non-uniform, two-dimensional intensity distribution in the plane defined by the substantially planar surface of screen 24. The intensity distribution, which may or may not be Gaussian, nonetheless typically has a relatively more intense central area and a less intense peripheral area, and as the beam sweeps across the screen it produces a trace in which phosphors near the center of the trace glow more brightly than phosphors near the edge of the trace. When the waveform produced by the trace is subsequently "captured" in the form of a charge distribution within CCD 28 of the camera system 26, nonzero charge may be developed within more than one capacitor along a CCD 28 array axis corresponding to a vertical axis on screen 24.

In accordance with the present invention, computer 38 converts the intensity data array in video RAM 33 into a waveform data sequence in which each successive data element represents the vertical position on the screen of a successive "intended target point" of the beam. The waveform data sequence thus indicates the trajectory of the intended target point of the beam as the beam sweeps across the screen. The "intended target point" of the beam at any instant is defined as the single point on the screen which represents the magnitude of the oscilloscope input signal controlling the vertical deflection of the beam at that instant, and the magnitude of a sweep signal controlling horizontal position of the beam at that instant. Since the beam has a distributed intensity, the beam strikes more than just one point on the screen at any given instant, and in a poorly calibrated oscilloscope the beam may not even strike the intended target point. Nonetheless, the trajectory of the target point across the screen is accurately determined according to the present invention by analyzing the intensity distribution of the waveform display as described hereinbelow.

The magnitude v(t) of an oscilloscope input signal is a single-valued function of time t. The intensity distribution w(x,y) of a waveform image produced on the oscilloscope screen 24 corresponds to the two-dimensional convolution of two functions g(x,y) and f(x,y) where x and y are horizontal and vertical coordinates of a point on the oscilloscope screen. Function g(x,y) describes the two-dimensional intensity distribution of the beam on the screen with respect to its intended target point. The function f(x,y) describes the trajectory of the intended target point of the beam on the screen in response to the input signal v(t) and the sweep signal controlling vertical and horizontal deflections of the beam, respectively. The x coordinate of the screen is scaled such that x = t and the y coordinate of the screen is scaled such that:

$$f(x,y) = 1 \text{ for } y = v(x) = v(t)$$
$$= 0 \text{ for } y \neq v(x) = v(t).$$

When the function f(x,y) has a value of 1, the point (x,y) is along the trajectory of the intended target point of the beam.

It is desirable that the waveform display produced by computer 38 on display monitor 48 represent v(t) as closely as possible in order to accurately represent the behavior of the oscilloscope input signal v(t). A waveform display on monitor 48 is produced by illuminating particular pixels of an array of pixel rows and columns. To be most representative of the input signal, the display produced on monitor 48 should comprise one illuminated pixel in each pixel column, and the particular pixels to be illuminated should be closest to points on the display monitor screen corresponding to points (x,y) on the oscilloscope screen where f(x,y)=1, i.e., closest to points representing the intended target points of the beam.

However, the data produced by camera system 26 does not directly represent f(x,y) but instead represents the waveform display intensity distribution w(x,y)=f(x,y) * g(x,y). (The * symbol represents the convolution of f(x,y) and g(x,y).) According to the present invention the trajectory of the intended target point of the beam across the screen is determined by finding the points along each of a plurality of vertical axes of the screen 24 at which the convolution of w(x,y) and g(x,y) is a maximum. The convolution integral of w(x,y) and g(x,y) is defined as follows:

$$V(x,y) = w(x,y) * g(x,y) \qquad [1]$$
$$= \int_{x'=-\infty}^{+\infty} \int_{y'=-\infty}^{+\infty} w(x',y') \cdot$$

-continued $$g(x - x', y - y')dx'dy'$$

The convolution integral [1] may be approximated by its discrete form when w and g are presented as arrays of discrete values rather than as continuous functions of x,y:

$$V(x,y) = \sum_{n=-\infty}^{+\infty} \sum_{m=-\infty}^{+\infty} w(n,m) \cdot g(x - n, y - m) \quad [2]$$

In the above equations [1] and [2], V(x,y) is the value of the convolution integral with respect to a point (x,y) on the screen, g is the function modeling the instantaneous intensity distribution of the beam on the surface of the screen for a given target point (x,y), and w is the function representing the time-averaged intensity distribution indicated by the intensity data array produced by the digitizing camera system 26. The target point (x,y) of the beam along each of several vertical axes x of the screen is determined to be at the position y along each vertical axis x at which the value V(x,y) of the convolution integral [1] is a maximum. The succession of target points on screen 24 determined in this fashion closely approximates the actual trajectory of the intended target point of the beam. Accordingly, when the distance between successive vertical axes is uniform, a waveform data sequence comprising only the vertical coordinates y of the determined succession of target points (x,y) of the beam accurately represents time varying behavior v(t) of the input signal. From such a waveform data sequence, microprocessor 40 can generate bit-mapped data sufficient to enable a conventional display controller 46 to produce the desired waveform display. The process of producing a waveform display according to a data sequence representing successive magnitudes of a waveform is well known in the art and not further detailed herein.

The method of determining the trajectory of a beam target point by evaluating the convolution integral of a function modeling instantaneous beam intensity distribution with respect to intended target point and a function modeling screen light intensity distribution, as described hereinabove, provides more accurate results than prior art methods involving locating the peak, median or centroid of waveform intensity distribution because the "convolution" method of the present invention does not rely on the faulty assumption that the target point of the beam necessarily corresponds to the peak, median or centroid of intensity distribution, but rather identifies the target point trajectory of the based on a model g(x,y) of the actual beam intensity distribution with respect to any target point on the screen.

The function g(x,y) may be obtained experimentally by setting the input signal and sweep signals to various known values corresponding to an array of target points covering screen 24 and utilizing the camera system 26 to measure the intensity distribution of the display for each such target point. The data thus acquired can be utilized in the form of a look-up table to provide the value of g(x,y) for any point (x,y) on the screen with respect to any intended target point. Alternatively, mathematical expressions of g(x,y) with respect to any target point may be developed which closely approximate the experimentally acquired distribution data. Curve fitting techniques permitting development of equations representing two-dimensional intensity distributions are well known in the prior art and not further detailed herein.

Figure 5:
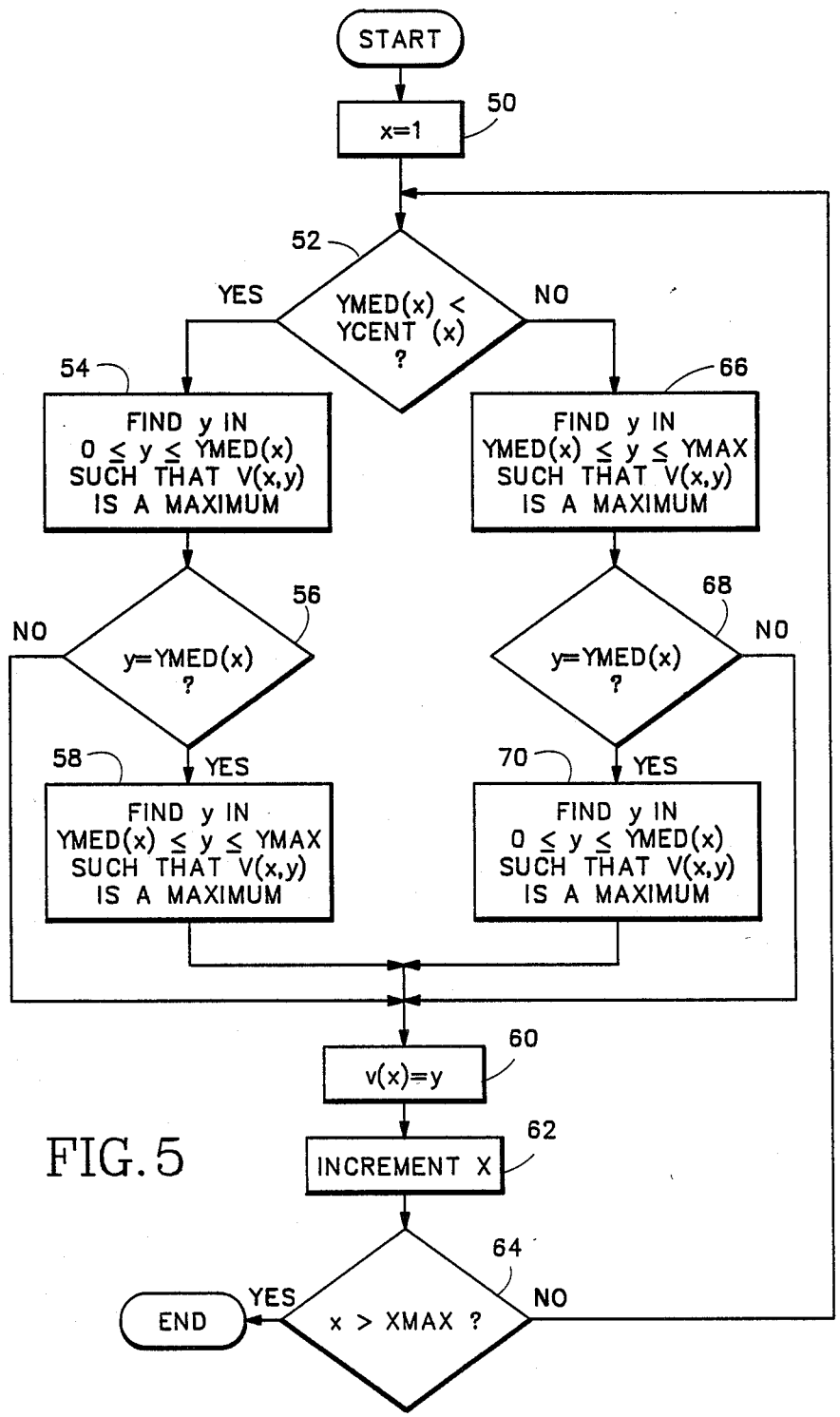
FIG. 5 is a flow chart for programming the microprocessor of the system of FIG. 4 in accordance with the present invention.

FIG. 5 is a flow chart for programming computer 38 in accordance with the present invention to produce a data sequence v in which each element v(x) indicates the vertical position y of an intended target point of the beam along a vertical axis ("axis x") passing through a separate point x along the horizontal axis of the oscilloscope screen. Starting in block 50, the value of x is set to 1 so as to reference a first vertical axis near the left edge of the waveform. Next (block the values YMED(x and YCENT(x) of the median and centroid of the screen intensity distribution along axis x are computed and compared. These values are computed from the intensity data array produced by digitizing camera 26 of FIG. 4. For typical electron beam intensity distributions in a well-calibrated oscilloscope, the target point along axis x will usually, though not always, be near the peak of light intensity along that axis. When the median is at a lower elevation than the centroid (i.e. when YMED(x) < YCENT(x)) the point of peak intensity will be below the median. Consequently when YMED(x) is less than YCENT(x) (block 52), the program initially searches (block 54) for a point y along vertical axis x at an elevation y greater than or equal to 0 and less than or equal to YMED(x) at which point the magnitude V(x,y) of the convolution integral according to equation [1] or [2] above is a maximum. (Algorithms for efficiently determining the maximum value of a function with respect to an independent variable are well known in the art and are not further detailed herein.)

If y is not equal to YMED(x) (block 56); indicating that a peak for V(x,y) was found on the interval 0≤y <YMED(x), then the value of the waveform sequence element v(x) is set equal to y (block 60) and the value of x is incremented (block 62). If x is not greater than XMAX (block 64), XMAX being the reference number associated with the rightmost vertical axis of the screen passing through the waveform for which a value of y is to be found, then the program returns to block 52 where the process of determining the next waveform sequence element v(x) for the new value of x begins.

If in block 56 it is determined that the value of y calculated in block 54 is equal to YMED(x), the value of y for which V(x,y) is maximum may be greater than YMED(x). Therefore, in block 58 the program searches for the point y along the axis x at an elevation between YMED(x) and YMAX (the maximum value that y may have) at which point the magnitude V(x,y) of the convolution integral according to equation [1] or [2] above is a maximum. This value of y is then assigned to v(x) (block 60). When YMED(x) is greater than YCENT(x) (block 52), the program initially searches (block 66) for a point y along vertical axis x at an elevation between YMED(x) and YMAX at which the magnitude of V(x,y) is a maximum. If y is not equal to YMED(x) (block 68), indicating that a peak for V(x,y) was found above YMED(x), then the value of the waveform sequence element v(x) is set equal to y (block 60). If in block 68 it is determined that the value of y calculated in block 66 is equal to YMED(x), indicating that the value of y for which V(x,y) is maximum may be less than YMED(x), then in block 70 the program searches for the point y along axis x at an elevation y between 0 and YMED(x) at which V(x,y) is maximum. This value of y is then assigned to v(x) (block 62).

The program continues to loop through blocks 52-64 until a waveform data sequence element v(x) has been produced for each value of x less than or equal to XMAX, at which point (block 64) the program ends. For most beam intensity distributions, the search routines in blocks 58 and 70 are not executed because a point of maximum V(x,y) will be found in blocks 54 and 66. Therefore the decision step 52 normally reduces the ranqe of y values over which the search for maximum V(x,y) must be made, thereby saving processing time. Additional reduction in processing time can be accomplished within blocks 54, 58, 66 and 70 by initially restricting the search to a range between YMED(x) and YMED(x)+/−[YMED(x)-YCENT(x)] because in typical beam distributions for a well-calibrated oscilloscope, the maximum value of V(x,y) will fall within an interval about YMED(x) equal to the difference between YMED(x) and YCENT(x).

It should also be noted that the vertical axes of the screen along which the magnitude of the convolution integral is evaluated in order to determine the trajectory of the target point need not correspond directly to vertical axes of the CCD capacitor array. Accordingly, the resolution with which the trajectory of the target point is determined may be increased or decreased by increasing or decreasing the number of vertical axes along which the convolution integral is evaluated in order to find a target point, thereby increasing or decreasing the number of elements in the data sequence representing the trajectory of the target point. In addition, it should also be noted that the position of a target point along a particular vertical axis as determined according to the present invention need not correspond to the relative position of any capacitor in the CCD but can occur anywhere along the axis. The resolution with which the tarqet point of maximum V(x,y) along any vertical axis is determined is primarily a function of the resolution of the particular search algorithm utilized in blocks 54, 58, 66 and 70 of FIG. 5. Thus a computer-generated waveform display produced according to the present invention can actually more clearly and accurately represent the behavior of an input signal to an analog oscilloscope than a waveform display produced on the oscilloscope screen from which the waveform data sequence was derived.

In the preferred embodiment of the invention, the convolution integral that is evaluated in order to establish the position of a target point of the beam along any particular vertical axis on the oscilloscope screen is a two-dimensional surface integral, as indicated in equations [1] and [2] hereinabove. In an alternative embodiment of the invention, the convolution integral is one-dimensional, the integration being performed along the vertical axis only. In such case only the light intensity distribution and the instantaneous beam distribution with respect to a target point along the vertical axis are convolved. The alternative method utilizing a one-dimensional convolution integral typically does not locate the trajectory of the intended target point of the beam as accurately as the preferred two-dimensional convolution integral method, but typically does so more accurately than the peak, median or centroid of intensity distribution methods of the prior art, and requires fewer calculations than the preferred method.

There has thus been described a method and apparatus by which the trajectory on a surface of the intended target point of a beam directed toward the surface is digitized. The digitized beam trajectory comprises a data sequence, each element of which indicates the position of a point on a separate parallel axis of the surface for which point the value of a convolution inteqral is a maximum, the integral convolving a function describing the instantaneous intensity distribution of the beam on the surface, with respect to the target point of the beam, with a function describing the time-averaged beam intensity distribution on the surface.

While preferred and alternative embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method for digitizing the trajectory of a target point of a moving beam directed toward a surface comprising the steps of:

determining a particular point along each of a plurality of parallel axes of the surface for which a two-dimensional convolution integral with respect to said particular point of two functions is a maximum, a first of the two functions comprising an instantaneous intensity distribution of the beam on the surface with respect to the position of the target point on the surface, and a second of the two functions comprising the average beam intensity distribution on the surface produced as the target point of the beam moves across the surface during a finite period; and generating a digital data sequence in which each data element thereof represents the position on the surface of a separate one of the particular points.

2. A method for digitizing the trajectory of a target point of a beam directed at a substantially planar surface of a sensing apparatus, said beam having an instantaneous intensity distribution with respect to said target point in a plane defined by said surface, said sensing apparatus being of the type which produces an array of intensity data, each element of said array representing a time-averaged intensity of portions of said beam that strike a separate portion of said surface during a period such that said intensity data array represents a two-dimensional average beam intensity distribution over said surface during said period, the method comprising the steps of:

evaluating the magnitude of a convolution integral convolving a function representing the intensity distribution of said beam with respect to the position of the target point of said beam on said surface with a function representing an intensity distribution of said beam in at least one dimension of said surface according to said intensity data array, said convolution integral being evaluated with respect to a plurality of points along each of a plurality of parallel axes on said surface; and selecting from among said plurality of points along each of said parallel axes a particular point along each axis, the selection being made by comparing the evaluated magnitude of said convolution integral for each of the plurality of points of said each axis.

3. The method in accordance with claim 2 further comprising the step of generating a data sequence wherein each data element of said data sequence conveys information representing the position on said surface of a separate one of the particular points along said axes.

4. The method in accordance with claim 2 wherein the particular point selected from among said plurality of points along each axis is that point for which the evaluated magnitude of said convolution integral is a maximum.

5. A method for digitizing the trajectory of a target point of a beam directed at a substantially planar surface of a sensing apparatus, said beam having a two-dimensional intensity distribution with respect to said target point in a plane defined by said surface, said sensing apparatus being of the type which produces an array of intensity data, each element of said array representing an average intensity of portions of said beam that strike a separate portion of said surface during a period such that said intensity data array represents a two-dimensional average beam intensity distribution over said surface during said period, the method comprising the steps of:

evaluating the magnitude of a two-dimensional convolution integral convolving a first function representing the two-dimensional intensity distribution of said beam with respect to the position of the target point of said beam on said surface with a second function representing the two-dimensional average intensity distribution of said beam on said surface represented by said intensity data array, said convolution integral being evaluated with respect to a plurality of points along each of a plurality of parallel axes on said surface;

selecting from among said plurality of points along each of said parallel axes a particular point along each axis for which the evaluated magnitude of said convolution integral is a maximum; and generating a data sequence wherein each data element of said data sequence conveys information representing the position on said surface of a separate one of the particular points along said axes.

6. An apparatus for digitizing a trajectory of a target point of a beam directed at a plane, said beam having an instantaneous intensity distribution in said plane with respect to said target point, the apparatus comprising:

means for producing an array of intensity data, each data element of said array representing an average intensity of portions of said beam that strike a separate portion of said plane during a period such that said intensity data array represents a two-dimensional average beam intensity distribution over an area of said plane during said period; and data processing means for evaluating the magnitude of a convolution integral convolving a first function representing an intensity distribution of said beam with respect to the position of the target point of said beam on said plane with a second function representing the average intensity distribution of said beam on said plane represented by said intensity data array, said convolution integral being evaluated with respect to a plurality of points along each of a plurality of parallel axes on said plane, and for selecting from among said plurality of points along each of said parallel axes a particular point along each axis, the selection being made according to results of evaluating said convolution integral for the plurality of points of said each axis.

7. The apparatus in accordance with claim 6 wherein said data processing means generates a data sequence wherein each data element of said data sequence conveys information representing the position on said plane of a separate one of the particular points along said axes.

8. An apparatus for producing a data sequence representative of an input signal comprising:

means for generating an electron beam;

a screen having a substantially planar surface for producing light in areas of said surface struck by portions of said beam, the intensity of said light being determined by the intensity of said portions of said beam;

means for positioning the intersection of said electron beam and the surface of said screen at a position along a first axis of the plane defined by the surface of said screen according to the magnitude of said input signal and at a position along a second axis of said plane perpendicular to said first axis according to the magnitude of a sweep signal, said beam having an intensity distribution in said plane with respect to a target point in said plane, said target point being at a position along said first axis of said plane representing the magnitude of said input signal and at a position along said second axis of said plane representing the magnitude of said sweep signal;

means for producing an array of intensity data, each data element of said array representing the intensity of light produced by a separate portion of said screen during a period such that said intensity data array represents a two-dimensional light intensity distribution over said screen during said period; and data processing means for evaluating the magnitude of a convolution integral convolving a first function representing the intensity distribution of light produced by said screen with respect to the position of the target point of said beam with a second function according to said intensity data array, said convolution integral being evaluated with respect to a plurality of points along each of a plurality of axes on said plane parallel to said first axis, and for selecting from among said plurality of points along each of said plurality of axes a particular point along each axis, said particular point along each axis being selected by comparing the magnitudes of the convolution integral as evaluated for the plurality of points along the axis, and determining the particular point for which the magnitude of said convolution integral is a maximum.

9. The apparatus in accordance with claim 8 wherein said data processing means generates said data sequence, each data element of said data sequence conveying information representing a position of a separate one of said particular points along said axes.

* * * * *